F. W. CLARKE.
Apparatus for Conveying Tan-Bark to and from Leaches.
No. 214,491. Patented April 22, 1879.
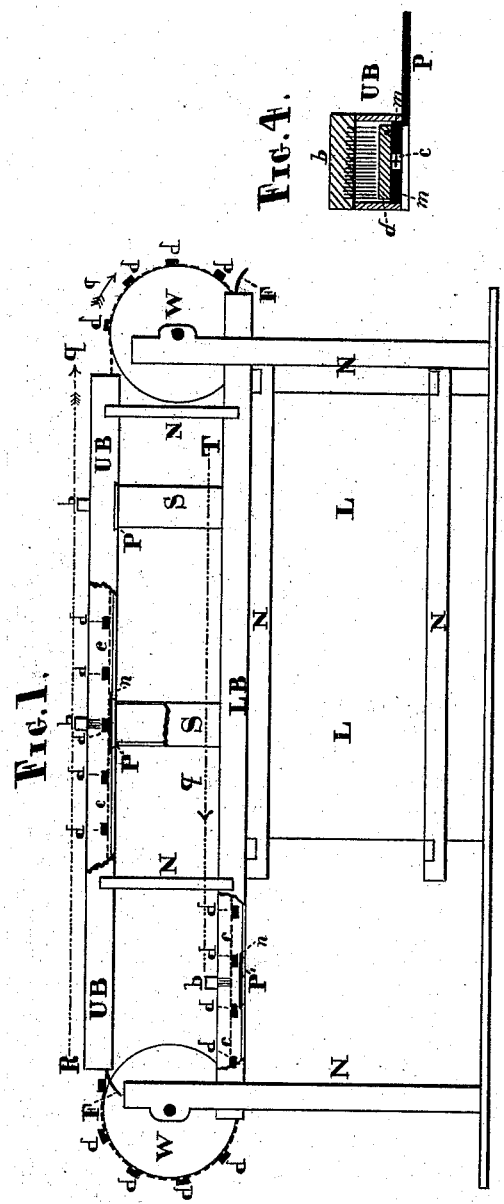
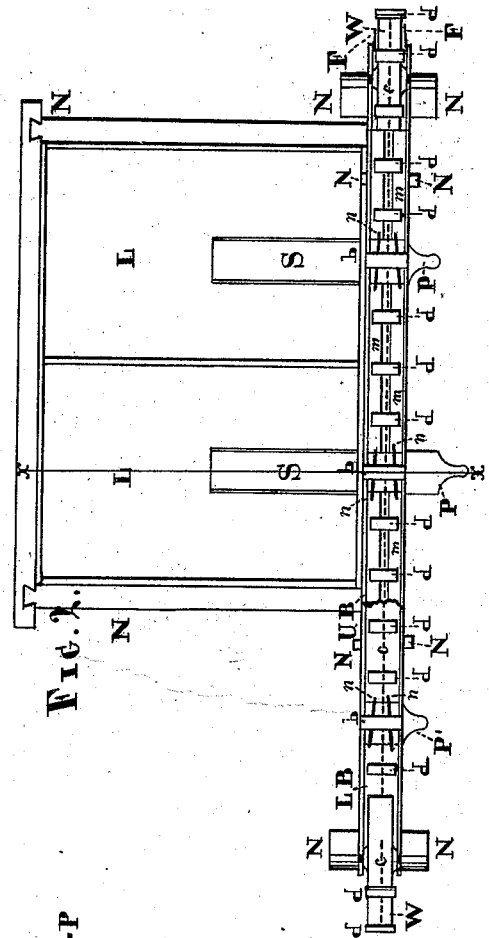
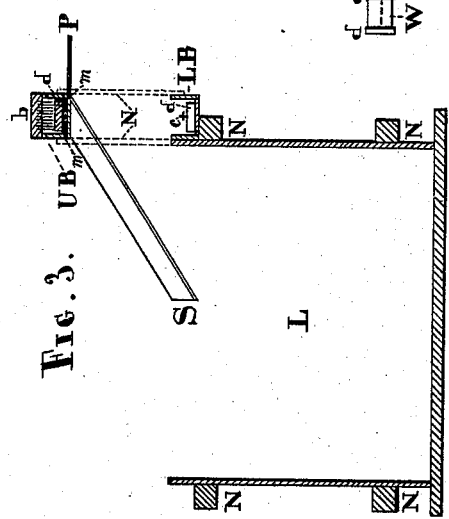
WITNESSES.
Arthur G. Morey.
William R. Manlove.
INVENTOR.
Frederick W. Clarke
by G. L. Chapin,
Atty.

UNITED STATES PATENT OFFICE.

FREDERICK W. CLARKE, OF CHICAGO, ILLINOIS.

IMPROVEMENT IN APPARATUS FOR CONVEYING TAN-BARK TO AND FROM LEACHES.

Specification forming part of Letters Patent No. 214,491, dated April 22, 1879; application filed September 14, 1878.

*To all whom it may concern:*

Be it known that I, FREDERICK W. CLARKE, of Chicago, in the county of Cook and State of Illinois, have invented a new and useful Improvement in Apparatus for Conveying Tan-Bark to and from Leaches, of which the following is a specification, reference being had to the accompanying drawings, illustrating the invention.

The object of the present invention is to provide more convenient means for conveying ground tan-bark, or tanning material, to leaches, and removing the same after the leaching process.

The nature of my invention consists in a conveyer-trough provided with cleats for guiding an endless chain, and bearers spanning the openings to the spouts, whereby the carriers on the chain are properly supported under the action or pressure of the brushes in sweeping the bark from the carriers.

It consists, further, in prongs attached to the ends of the conveyer-troughs, properly to guide the carriers of the conveyer into the troughs after they leave the drums or sprocket-wheels.

In the drawings, Figure 1 is a longitudinal elevation of an apparatus embodying my invention, with a portion of the front board of the upper and lower troughs broken away to show the interior devices. Fig. 2 is a plan view of Fig. 1, with the left-hand part of the upper trough broken away to show a plan view of that portion of the lower trough in which the cut-off is placed. Fig. 3 is a transverse section on line $x$, Fig. 2. Fig. 4 is a two-diameter view of the upper trough, brush, chain and carrier, cut-off, and cleats, shown in Fig. 3.

In the terms of the art, a conveyer is the whole device by which any body is moved; but, for convenience, applicant has divided the devices of the conveyer, and terms one part a "trough," the other part a "carrying-chain," and the parts attached to the chain "transverse carriers." L L represent two ordinary leaches of a tan-yard. U B represent an upper trough, and L B a lower trough, which are made of wood or other suitable material, and of such depth, width, and length as may be required to move a given quantity of ground tan-bark any desired distance in a specified time, and they are supported by any ordinary framework, N, a convenient height above the leaches. Spouts S, corresponding with the number of leaches, are attached to the under side of the trough U B, and directly over where the spouts are attached holes are made through the bottom of the trough, that tan-bark may pass through either spout into its respective leach. That tan-bark may be carried past one spout, or more spouts, and be discharged through a spout farther on in the conveyer, slides or cut-offs P are fitted to move transversely in the bottom of the trough, so that when one cut-off is drawn out, as the one is over the left-hand spout S, Fig. 2, tan-bark will be discharged through that spout into its respective leach L below. If the cut-off P over the right-hand spout S be drawn out, and the cut-off over the left-hand spout S be closed, tan-bark will be discharged into the right-hand leach L.

More spouts and cut-offs are added, according to the number of leaches. Cleats $m$, of a height corresponding with the depth of the chain $c$, are placed in the lower angles of the upper trough, U B, and extend inwardly far enough to form a suitable groove or channel for the chain to run in. These cleats, however, do not extend across the openings in the bottom of the trough over the spouts S. Transverse carriers $d$, made of wood or other suitable material, are fastened to the chain $c$, and they slide on the cleats $m$; and to guide these carriers over the holes in the troughs and prevent the chain from sagging by the action of the brushes $b$, metal bearers $n$ are fastened to the cleats $m$, and extend across said openings, Figs. 1 and 2, thus forming a continuous bearing for the carriers $d$ without materially obstructing the mouths of the spouts S.

The lower trough is a plain box. The cleats $d$ run on its bottom, which is provided with a discharge-opening and a cut-off, P', of like construction to cut-offs P. P' is represented as closed, but should be opened when spent tan is to be discharged at that place which the cut-off covers.

It is observed that the bearers $n$ are placed diagonally to each other. This is that they may not wear narrow grooves in the transverse carriers $d$.

Brushes $b$, made of hair, wires, or splints, attached to suitable stocks, are fastened to the top parts of the troughs, and extend down into the troughs, to sweep the tan-bark or spent tan from the transverse carriers $d$, and guide it into the openings made in the bottom of the troughs.

F represents curved iron prongs attached to the opposite ends of the upper and lower troughs, outside of the ends of the drums W. Their use is to guide the carriers $d$ into the troughs, and prevent their tipping and being torn from the chain $c$ by coming in contact with the ends of the troughs.

The ground tan-bark is put into the trough U B at R, and the spent tan is put into the trough L B at T. The drums W have given to them a rotary motion by suitable power, in the ordinary manner, to move the carriers $d$ in direction of darts $q$.

I claim as new and desire to secure by Letters Patent—

1. The combination of the bearers $n$ with the troughs U B L B, carriers and chain $d$ $c$, and cleats $m$, as set forth.

2. The brushes $b$, in combination with the carriers $d$, bearers $n$, troughs U B L B, and spouts S, as specified and shown.

3. The combination of the prongs F with the troughs U B L B, endless conveyer-chain $c$, and carriers $d$, as specified.

FREDERICK W. CLARKE.

Witnesses:
A. G. MOREY,
G. L. CHAPIN.